United States Patent [19]
Berteau

[11] Patent Number: 5,582,276
[45] Date of Patent: Dec. 10, 1996

[54] ROTATION MODERATOR

[75] Inventor: Franck Berteau, Meru, France

[73] Assignee: ITW de France, Beauchamp, France

[21] Appl. No.: 489,401

[22] Filed: Jun. 12, 1995

[30] Foreign Application Priority Data

Jul. 8, 1994 [FR] France .................................. 94 08484

[51] Int. Cl.⁶ ..................................................... F16D 63/00
[52] U.S. Cl. ......................... 188/82.84; 188/381; 74/574
[58] Field of Search ................................ 188/82.84, 293, 188/322.5, 381; 267/136, 141.1, 141.3, 141.7, 201, 205, 208; 74/531, 574

[56] References Cited

U.S. PATENT DOCUMENTS

| | | |
|---|---|---|
| 1,774,094 | 8/1930 | Gulick . |
| 3,321,052 | 5/1967 | Ramoneda et al. ...................... 188/293 |
| 3,871,496 | 3/1975 | Wigal ................................... 188/322.5 |
| 4,497,393 | 2/1985 | Brems .................................. 188/322.5 |
| 4,840,083 | 6/1989 | Hagan et al. . | 
| 5,276,945 | 1/1994 | Matsumura .......................... 188/82.84 |

FOREIGN PATENT DOCUMENTS

| | | |
|---|---|---|
| 2674588 | 10/1992 | France . |
| 960963 | 9/1965 | Germany . |
| 386782 | 4/1965 | Switzerland . |
| 209755 | 1/1924 | United Kingdom . |
| 320295 | 10/1929 | United Kingdom . |
| 1036191 | 7/1966 | United Kingdom . |

Primary Examiner—Robert A. Oberleitner
Assistant Examiner—Chris Schwartz
Attorney, Agent, or Firm—Schwartz & Weinrieb

[57] ABSTRACT

A stator (2), a rotor (5, 6, 7, 8), and an elastic element (3) and rolling members (4) are provided to collectively form a rotational damper. When the rotor has, with respect to the stator, a rotational movement to be moderated, the balls or rolling members (4) are driven by the rotor while remaining partially embedded in the elastic element (3), the latter having a wall (16) parallel to the end walls (10A, 10B) of the stator (2), in which the balls (4) penetrate, so as to resist and thereby dampen the rotational movement. This embodiment provides two-directional dampening. In accordance with a second embodiment, one-directional dampening is achieved by the balls (4) being disposed within variable depth recesses (24') of the rotor element (5').

22 Claims, 2 Drawing Sheets

ROTATION MODERATOR

FIELD OF THE INVENTION

The invention concerns a rotation moderator which has an elastic element and at least one rolling member which remains partially embedded in the elastic element when it is driven by a rotor which receives the rotational movement, the braking or damping effect being obtained by virtue of the resistance of the elastic element to being deformed.

1. Background of the Invention

A moderator is already known from French Patent Application No 92-03741. This moderator of the aforenoted type has a stator consisting of two dish-shaped components, one of which covers the other so as to form a housing in which an annular ring made of an elastic plastic material is disposed against the peripheral wall while it surrounds a circular element with a smaller diameter forming part of the rotor. Balls are disposed between the ring and the circular element which, to this end, has notches in its periphery, and the rotational mounting of the rotor is effected by means of a small shaft which the stator has in the centre of its housing, projecting away from the bottom of the latter. The rotor component of which the circular element forms a part has in its centre a bore through which projects the shaft, and this component also has, opposite the bore, an arbor which passes through the stator cover by means of a hole formed in the centre of the cover, the rotor also having, outside the housing, a pinion fixed to the arbor so as to receive the rotational movement to be moderated.

2. Object of the Invention

The invention aims to improve the aforenoted type of moderator, notably in terms of the precision of the braking torque obtained.

SUMMARY OF THE INVENTION

To this end, it proposes, in accordance with a first aspect, a rotation moderator having a stator, a rotor, an elastic element and at least one rolling member all of, which cooperate so that, when the rotor has, with respect to the stator, a rotational movement to be moderated, each rolling member is driven by the rotor while remaining partially embedded in the elastic element. The stator comprises a housing receiving the elastic element and each rolling member, and an internal element of the rotor is provided with an engagement means for each rolling member. The housing has two opposite end walls transverse to the rotational axis of the rotor, and the elastic element has a wall parallel to the to end walls of the housing, and it is in this wall that each one of the rolling member is disposed.

The force which constrains the rolling member or members against the elastic element is therefore exerted in a direction corresponding to the thickness of the housing.

Variations in the dimensions of the various components which cooperate in order to obtain this constraining force therefore influence the intensity of this force, and the maximum dimensions correspond to this thickness, whereas in the aforementioned prior moderator the corresponding maximum value is much greater, since it is of the same order of magnitude as the radius of the housing.

Thus any one relative variation in size will, in the moderator according to the present invention, have much less influence upon the braking torque than in the prior moderator.

In particular, the moderator according to the invention offers a braking torque which is less dependent upon temperature, since it is less sensitive to expansion phenomena.

Furthermore, as regards manufacture, the present moderator offers torque values that are more precise and more constant, particularly in the case in which certain components, at least, are obtained by moulding a plastic material. Slight, differences in shrinkage which can occur during large-scale manufacture thus have less influence upon this torque value.

According to characteristics preferred for their simplicity and convenience of implementation, the parallel wall of the elastic element has a face, referred to as the first face, which is disposed against a first one of the end walls of the housing, and each rolling member, and the internal element of the rotor, are disposed between the second end wall of the housing and a second face of the parallel wall opposite the first face.

In accordance with a first embodiment, each rolling member has a diameter greater than the distance between the parallel wall of the elastic element and the second end wall of the housing, with which each one of the rolling members is in contact, and each one of the means of engagement for each one of the rolling members for which the internal element is provided is open both on the same side as the parallel wall of the elastic element and on the same side as the second end wall of the housing.

Each rolling member is thus kept continuously embedded in the elastic element, so that the moderator offers a continuous braking torque.

In accordance with a second embodiment, at least one the engagement means for the rolling member for which the internal element of the rotor is provided is a cavity closed on the same side as the second end wall of the housing, the cavity being elongate, with an orientation other than radial, and having a bottom inclined between the two ends such that the depths of the ends are different.

Because of the orientation in which the cavity extends, the rolling member disposed in the cavity is located at one or the other one of these ends, according to the direction of rotation of the, the difference in the depth of these ends makes the intensity of the braking operation a function of the direction in which the internal element of the rotor is turned.

According to preferred characteristics of this embodiment, the depth of one of the ends of the cavity is such that the distance between the parallel wall of the elastic element and the bottom of the cavity is greater than or equal to the diameter of the rolling member, while, at the other end, this distance is less than the diameter of the rolling member.

Thus, when the rolling member is at the first end of the cavity, it does not penetrate the elastic element, and does not, therefore, resist the rotational movement. There is therefore a direction of rotation in which the moderator is not active, which is, for example, advantageous in cases where the moderator is used to brake the opening of a cover which is driven in such a direction by a spring, while the moderator is also thus enabled not to brake the cover in the direction of closure in view of the fact that the spring must already be compressed.

The invention also aims to simplify the manufacture of rotation moderators of the aforementioned type.

To this end it proposes, according to a second aspect of the invention, a moderator which is characterised in that the opposite end walls of the housing of the stator are connected by a lateral wall having an interruption forming an opening adapted to allow the insertion into the housing, by sliding in a radial direction, of an assembly including the elastic element, the internal element of the rotor disposed in the elastic element, and each one of the rolling members disposed in its engagement means in the internal element.

According to preferred characteristics:

the elastic element has a peripheral wall, one part of which, referred to as the first part, is bounded on the outside by the lateral wall of the housing, and the rest of which, referred to as the second part, closes off the opening of the housing, the peripheral wall surrounding the internal element of the rotor;

the peripheral wall has, at each connection between the first part and the second part, a flat which comes against a flat on the said lateral wall of the housing.

The latter characteristics offer the advantage of preventing, in a particularly reliable way, the elastic element from turning with respect to the stator.

According to other characteristics preferred for their convenience and simplicity of implementation:

the internal element of the rotor is flat and has a central hollow for engaging a transmission shaft connected to an external element of the rotor and passing into a central hole in at least one of the end walls of the housing;

the wall of the elastic element parallel to the end walls of the housing has a central hole for a transmission shaft connected to an external element of the rotor and passing into a central hole in at least one of the end wall of the housing;

the elastic element is in the shape of a dish, the bottom wall of which corresponds to the parallel wall;

the stator is made of a plastic material moulded in a single piece.

It will be observed that the characteristics disclosed above in relation to the second aspect of the invention could be implemented in a moderator which did not have the characteristics proposed by the first aspect of the invention.

BRIEF DESCRIPTION OF THE DRAWINGS

The disclosure of the invention will now be continued with a description of an examplary embodiment, assisted hereinafter by way of non-limitative illustration as a result of reference to the accompanying drawings in which like reference characters designate like or corresponding parts throughout the several views and wherein.

DETAILED DESCRIPTION OF THE ILLUSTRATED EMBODIMENTS

Figure 1:
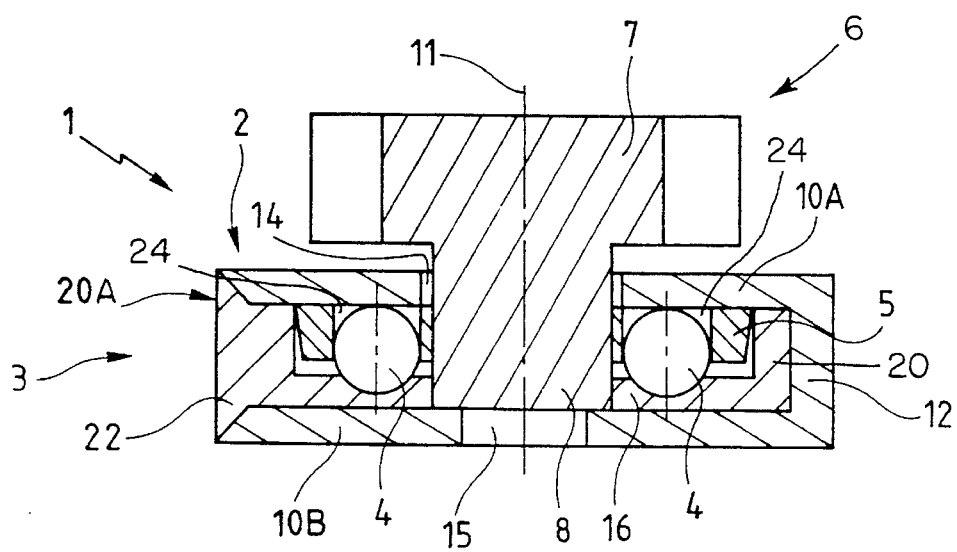
FIG. 1 is an elevation view in cross section through a plane of symmetry of a moderator constructed in accordance with the present invention.

The rotation moderator 1 shown in FIGS. 1 to 5 includes a stator 2, an elastic element 3, two balls 4, and a rotor including an internal element 5 and a complementary element 6 formed by a pinion 7 extended on one side by a transmission shaft 8.

With the exception of the balls 4, which are made of steel, all the components which form the moderator 1 are made of plastic moulded in a single piece.

The stator 2 includes two end walls 10A and 10B disposed opposite each other, which are transverse to the rotational axis 11 of the rotor elements 5 and 6, and a lateral wall 12 extending over a little more than 180°, on the outside of which are connected two diametrically opposite lugs 13 for fixing the stator 2 to a suitable support. A central hole 14 is provided for the passage of the shaft 8 through the wall 10A, and a hole 15 with a smaller diameter is provided in the wall 10B. In each of the lugs 13 a hole is provided for a fixing screw.

The walls 10A, 12 and 10B define a housing whose opening is formed by the interruption in the wall 12 between the lugs 13.

Figure 3:
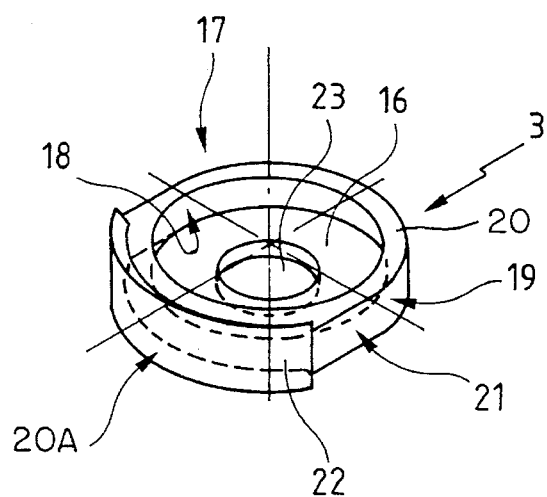
Figure 2:
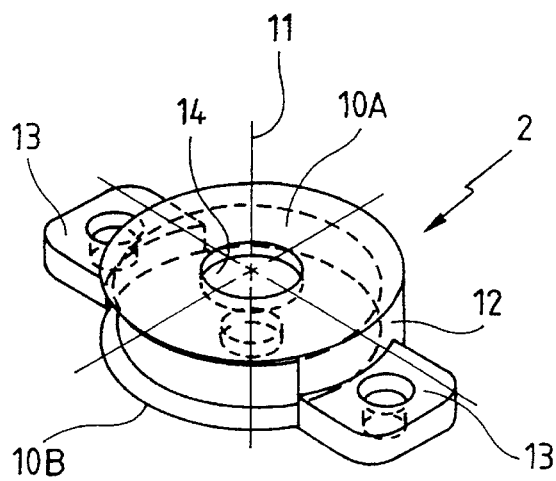

The elastic element 3 is in the shape of a dish with a bottom wall 16 and a peripheral wall 17, the internal surface 18 of which is cylindrical, and the external surface 19 of which has a semi-cylindrical part 20 situated on the right as seen in FIG. 3, a partially cylindrical part 20A the diameter of which corresponds to that of the walls 10A and 10B and the angular extension of which corresponds to that of the interruption in the wall 12, and two plane surfaces 21 which connect the partially cylindrical part 20A to the semi-cylindrical part 20. The partially cylindrical part 20A is the external lateral limit of a portion 22 of the peripheral wall 17 which is thicker than the rest of the latter, and the thickness of which increases up to the part 20, 20a as is also seen in FIG. 1. A hole 23 for receiving the shaft 8 is formed in the bottom wall 16.

The internal element 5 of the rotor is circular, with a diameter corresponding to that of the surface 18 of the element 3, it is flat, with a thickness less than that of the balls 4, and it has two cylindrical orifices 24 of a diameter corresponding to that of the balls 4, which are designed to engage therein, and a central cut out portion 25 of the same shape as the shaft 8 of the element 6, which is designed-to engage therein. In order to assemble the moderator 1, the element 5 is disposed in the hollow or cavity portion of the element 3, the balls 4 are placed in the orifices 24, the assembly thus formed is disposal in front of the housing opening in the stator 2 formed by the interruption of the wall 12, with the semi-circular part 20 of the peripheral wall 17 disposed first, this assembly is slid radially inwardly until it is completely positioned in the housing portion of the stator 2, the semi-circular part 20 of the wall 17 coming to bear against the internal surface of the wall 12, in the same way as that of the flat parts 21 for which corresponding flats are provided on the internal surface of the wall 12, the portion 22 of the wall 17 closing off the orifice of the housing. The element 6 is then put in place, by inserting the shaft 8 into the hole 14, and continuing to insert it until it comes to be engaged in the central hollow or cut-out portion 25 of the element 5, the base of the shaft 8 coming to bear upon the internal surface of the wall 10B. The moderator 1 is then in the assembled state shown in FIG. 1.

It can be seen that the shaft 8 prevents the withdrawal of the assembly that has been inserted into the housing of the stator by sliding the same in the radial direction, and that the rotational mounting of the shaft 8 is effected by its fitting into the hollow or cut out portion 25 of the element 5, the rotation of the elastic element 3 with respect to the stator 2 being prevented by the cooperation between the flat parts 21 of the surface 19 and the flats on the internal surface of the wall 12.

As can be seen in FIG. 1, the bottom wall 16 of the elastic element 3 is parallel to the end walls 10A and 10B, and the balls 4, which are in contact with the walls 16 and 10A, penetrate into the wall 16, since their diameters are greater than the distance separating these walls.

When the pinion 7 receives a rotational movement, the internal element 5 of the rotor is driven with respect to the stator 2 by means of the shaft 8, and the resistance of the elastic element 3 to being deformed produces a resistant torque which brakes, damps or slows the rotational movement communicated to the rotor.

Figure 6:
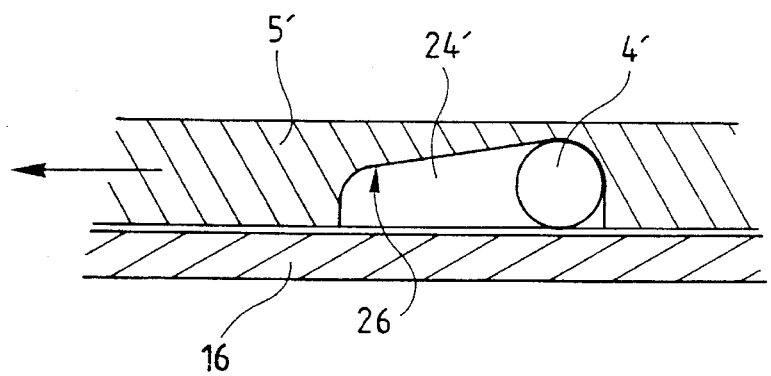
FIGS. 6 and 7 are elevation views in cross section along a cavity for the engagement of the balls included in the internal element of the rotor in accordance with a variant of the moderator, showing the position adopted by the ball when the rotor turns in one direction or the other.
Figure 7:
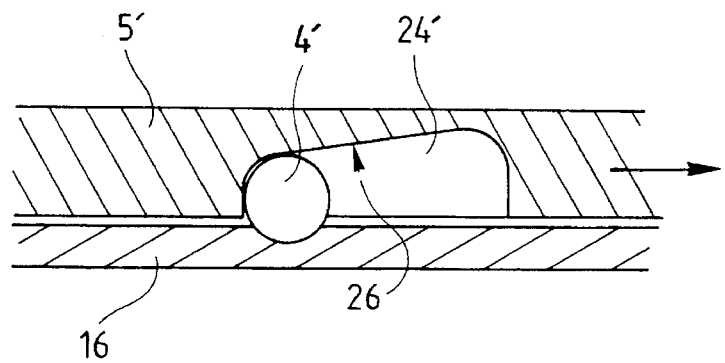
Figure 4:
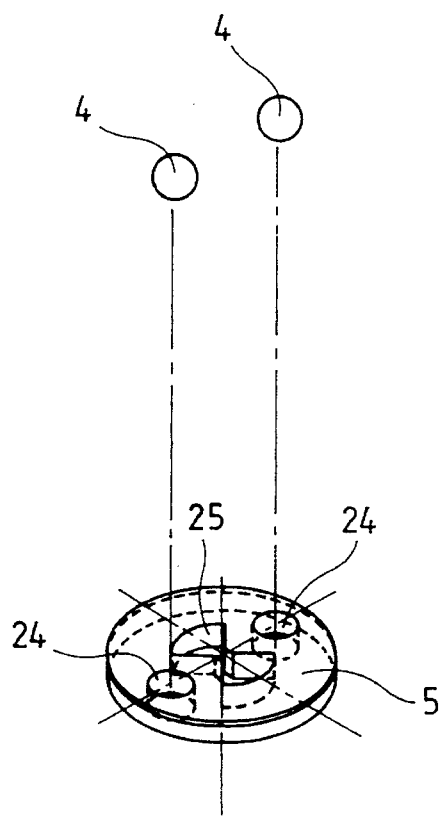
FIGS. 2 to 5 are perspective views, respectively of the stator of the moderator, of its elastic element, of the internal element of the rotor and of the rolling elements, which are balls in this case, and of the second component of the rotor, which includes a pinion and a transmission shaft.
Figure 5:
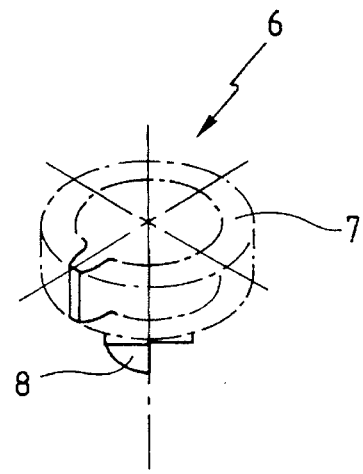

In the variant shown in FIGS. 6 and 7, the internal element 5 of the rotor is replaced by an element 5', the thickness of which corresponds to the distance between the walls 16 and 10A, and the balls 4 are replaced by balls 4', the diameters of which are less than the thickness of the element 5'. Rather than being disposed in cylindrical orifices which were open both towards the wall 16 and towards the wall 10A, the balls 4' are each disposed in a cavity 24' which is closed on the same side as the wall 10A, each cavity extending in an arc of a circle centred on the axis 11, and having a bottom portion 26 which inclined between these two ends and the walls 16 and 10A such that the depths of the ends are different.

More precisely, the depth of the end at which the ball 4' in FIG. 6 is situated is such that the distance between the wall 16 and the bottom portion 26 is slightly greater than the diameter of the ball 4', whereas at the other end this distance is less, so that it penetrates into the wall 16 as seen in FIG. 7, in contrast with what happens in the position in FIG. 6.

Because of the orientation of the cavity 24', when the element 5' moves in the direction shown by an arrow in FIG. 6, the ball 4' is placed at the end where it is not embedded in the wall 16, and the rotor of the moderator 1 can turn freely; whereas when the element 5' is driven in the opposite direction, as shown by an arrow in FIG. 7, the ball 4' comes to the other end of the cavity 24', where it is held embedded in the wall 16', and the rotational movement communicated to the rotor 7 is moderated.

Numerous variants are possible depending on the circumstances, the balls being able, notably, to be replaced by other rolling elements, cylindrical for example, and the rotational mounting of the rotor with respect to the stator can be effected through a tight running fit between the external walls of the shaft 8 and holes corresponding, but with a different diameter, to those given the reference numerals 14 and 15 in the drawings.

It should be stated that the invention is not limited to the examples described and depicted. It is to be understood that within the scope of the appended claims, the present invention may be practiced otherwise than as specifically described herein.

I claim:

1. A rotational dampener, comprising:

a rotor rotatable about a rotational axis;

a stator;

an elastic element fixedly mounted upon said stator and having a dampening surface extending in a direction transverse to said rotational axis of said rotor; and means mounted upon said rotor for undergoing rotational movement with said rotor with respect to said stator and said elastic element of said stator, and for engaging said dampening surface of said elastic element of said stator extending in said transverse direction so as to deform said elastic element of said stator, while said rotor, and said means mounted upon said rotor and engaging said dampening surface of said elastic element of said stator, rotates with respect to said stator and said elastic element of said stator, such that deformation of said elastic element of said stator generates dampening forces to dampen said rotational movement of said rotor.

2. A moderator or dampener as set forth in claim 1, wherein:

said stator comprises a housing; and said rotor and said elastic element are respectively rotatably and fixedly disposed within said housing.

3. A moderator or dampener as set forth in claim 2, wherein:

said rotor substantially comprises a circular disk having a plurality of apertures defined therein; and said means mounted upon said rotor for engaging said elastic element comprises a plurality of roller members disposed within said apertures.

4. A moderator or dampener as set forth in claim 3 wherein:

said stator housing comprises upper and lower spaced walls;

said elastic element is fixedly mounted upon said lower wall of said stator housing;

said rotor is rotatably mounted within an upper portion of said housing; and said roller members are mounted within said rotor so as to always be embedded within said elastic element of said stator such that regardless of the relative directional rotation of said rotor with respect to said stator housing, said roller members will elastically deform said elastic element such that said dampener comprises a two-way directional dampener.

5. The moderator or dampener as set forth in claim 4, wherein:

said elastic element comprises a flattened disk portion having a first surface disposed in contact with said lower wall of said stator housing, and a second surface disposed toward said upper wall of said stator housing; and said rotor and said roller members are interposed between said upper wall of said stator housing and said second surface of said elastic element.

6. The moderator or dampener as set forth in claim 5, wherein:

the thickness of each one of said roller members is greater than the distance defined between said upper wall of said stator housing and said second surface of said elastic element such that said plurality of roller members are always embedded within said elastic element.

7. The moderator or dampener as set forth in claim 3, wherein:

said stator housing has an opening defined within a peripheral sidewall portion thereof; and said elastic element, said rotor, and said roller members can be slidably inserted into said stator housing as a pre-assembled unit through said stator housing opening.

8. The moderator or dampener as set forth in claim 7, wherein:

said elastic element and said stator housing have flattened sidewall portions engaged with each other for preventing said relative rotation of said elastic element and said stator housing.

9. The moderator or dampener as set forth in claim 7, wherein:

said elastic element comprises a peripheral wall portion having a first section which is at least semi-circular in arcuate extent and is disposed internally within said stator housing, and a second section which is partially circular in arcuate extent, is disposed externally of said stator housing, and closes said opening defined within said peripheral sidewall portion of said stator housing.

10. The moderator or dampener as set forth in claim 7, further comprising:

a shaft fixedly connected to said rotor and projecting axially outwardly from said stator housing so as to prevent slidable removal of said elastic element, said rotor, and said roller members back out from said stator housing through said stator housing opening; and a pinion mounted upon an end of said shaft disposed externally of said stator housing for imparting said rotational movement to said rotor.

11. A moderator or dampener as set forth in claim 3, wherein:

said roller members comprise balls.

12. A moderator or dampener as set forth in claim 2, wherein:

said rotor substantially comprises a circular disk having a plurality of recesses defined therein; and said means mounted upon said rotor for engaging said elastic element comprises a plurality of roller members disposed within said plurality of recesses.

13. The moderator or dampener as set forth in claim 12, wherein:

said stator housing comprises upper and lower spaced walls;

said elastic element is fixedly mounted upon said lower wall of said stator housing;

said rotor is rotatably mounted within an upper portion of said stator housing;

said recesses of said rotor have varying depth dimensions from one end of each of said recesses to an opposite end of each of said recesses; and said roller members are mounted within said recesses of said rotor such that upon rotation of said rotor in a first direction, each roller member will be forced toward a first shallow end of a respective recess and be embedded within said elastic element of said stator so as to elastically deform said elastic element and thereby generate a dampening force, whereas upon rotation of said rotor in a second direction with respect to said stator housing, each roller member will be disposed within a second deeper end of a respective recess so as not to become embedded within said elastic element of said stator and thereby not generate a dampening force by not elastically deforming said elastic element, whereby said dampener comprises a one-way directional dampener.

14. The moderator or dampener as set forth in claim 13, wherein:

said elastic element comprises a flattened disk portion having a first surface disposed in contact with said lower wall of said stator housing, and a second surface disposed toward said upper wall of said stator housing; and said rotor and said roller members are interposed between said upper wall of said stator housing and said second surface of said elastic element.

15. The moderator or dampener as set forth in claim 14, wherein:

each one of said recesses of said rotor has an inclined bottom surface disposed toward said elastic element and extending between said one of said recess toward said opposite end of said recess so as to define said varying depth dimensions; and the thickness of each one of said roller members is greater than the distance defined between said elastic element and said inclined bottom surface of said recess at said first shallow end of said recess, and is less than the distance defined between said elastic element and said inclined bottom surface of said recess at said second deeper end of said recess.

16. The moderator or dampener as set forth in claim 13, wherein:

said recesses of said rotor extend in a circumferential direction with respect to said rotor and said stator housing.

17. The moderator or dampener as set forth in claim 12, wherein:

said stator housing has an opening defined within a peripheral sidewall portion thereof; and said elastic member, said rotor, and said roller members can be slidably inserted into said stator housing as a pre-assembl- ed unit through said stator housing opening.

18. The moderator or dampener as set forth in claim 17, wherein:

said elastic element and said stator housing have flattened sidewall portions engaged with each other for preventing said relative rotation of said elastic element and said stator housing.

19. The moderator or dampener as set forth in claim 17, wherein:

said elastic element comprises a peripheral wall portion having a first section which is at least semi-circular in arcuate extent and is disposed internally within said stator housing, and a second section which is partially circular in arcuate extent, is disposed externally of said stator housing, and closes said opening defined within said peripheral sidewall portion of said stator housing.

20. The moderator or dampener as set forth in claim 17, further comprising:

a shaft fixedly connected to said rotor and projecting axially outwardly from said stator housing so as to prevent slidable removal of said elastic element, said rotor, and said roller members back out from said stator housing through said stator housing opening; and a pinion mounted upon an end of said shaft disposed externally of said stator housing for imparting said rotational movement to said rotor.

21. A moderator or dampener as set forth in claim 12, wherein:

said roller members comprise balls.

22. The moderator or dampener as set forth in claim 2, further comprising:

a shaft fixedly connected to said rotor and projecting axially outwardly from said stator housing; and a pinion mounted upon an end of said shaft disposed externally of said stator housing for imparting said rotational movement to said rotor.

* * * * *